April 24, 1928. 1,667,536
G. L. CHANIER
MEANS FOR PREVENTING PREMATURE UNCOILING OF FILM BOBBINS
Filed Feb. 4, 1927
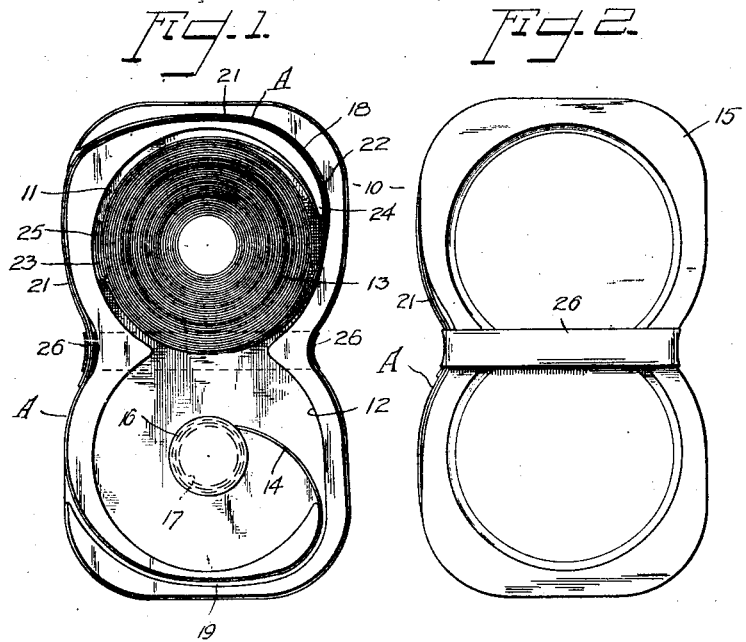
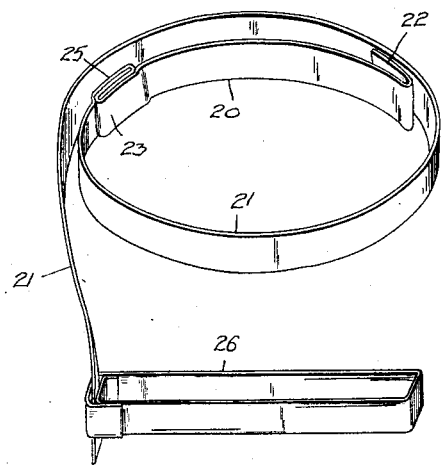
Gaston L. Chanier
INVENTOR
BY
his ATTORNEY.

Patented Apr. 24, 1928.

1,667,536

UNITED STATES PATENT OFFICE.

GASTON L. CHANIER, OF JERSEY CITY, NEW JERSEY, ASSIGNOR TO PATHE EXCHANGE, INC., OF NEW YORK, N. Y., A CORPORATION OF NEW YORK.

MEANS FOR PREVENTING PREMATURE UNCOILING OF FILM BOBBINS.

Application filed February 4, 1927. Serial No. 165,817.

My invention relates to improvements in attachments for motion picture film holders or magazines in which the manufacturers furnish film to the user.

The primary object of the invention is to provide a container which will carry a roll of unexposed film in one compartment and which will accommodate therein a band encircling the film roll and projecting outside the holder for the purpose of confining the film in tightly wound condition until released and made ready for use in a camera.

A further object of my invention is to provide a sealing strip arranged about a loaded magazine and attached to the band holding the film roll and to the film, for the purpose of securely holding the strip and film in place until ready for use and also to indicate to the user, if the seal is unbroken, that the enclosed film is in the same condition as when delivered by the manufacturer.

Heretofore, manufacturers of motion picture film and particularly those distributing small caliber film to amateur photographers, have provided holders or magazines, which are accommodated by their respective types and designs of cameras, and which carry the unexposed film and sometimes the exposed film as well, in rolls ready to be run through the motion picture camera. The type of film holder to which the present invention is particularly applicable is one in which the container is provided with two compartments, one thereof for the raw or unexposed film and the other for the film after exposure. The film in this case is originally enclosed in one compartment and one end is threaded through a light-tight passage to the exterior of the holder and then back again through another passage to be wound on a spool in the other compartment. The unexposed film roll when inserted in the first compartment is tightly wound and it is calculated to have the circumference of the roll slightly less than the circumference of the compartment. If the film roll were to remain tightly wound there would be no difficulty in unwinding the same after the holder is installed in and operatively connected with the mechanism of the camera, but due to the inherent nature of the film material, the latter has a tendency to uncoil or expand after being loaded in the holder, with the result that the outer coil of film is tightly jammed against the wall of the compartment and the frictional engagement brought about by the contact is sufficient to prevent the film from being unwound and drawn out of the holder by the mechanism in the camera. The present invention is intended to eliminate the uncoiling of the film roll until the latter is released just prior to loading the holder in a camera. I accomplish this purpose by means of a holding strip or band so arranged in the magazine and about the film roll as to retain the roll tightly wound until the band is withdrawn and the film released.

The containers for motion picture film and particularly the type utilizing the retaining strip for the film roll are composed of two parts, a magazine containing the film compartments, and a cover adapted to close over the magazine. The cover is intended to be removed only by the manufacturer at the time of reloading and removal of the exposed film from the container. In some cases it has been found that the container has already been opened by an unauthorized person before purchase by the user, in which instance the film has been fogged, resulting, by chance, in the destruction of a valuable record. In view of this and similar conditions it has been found desirable to place a seal on the container, which cannot be opened without destroying the seal and otherwise indicating to the purchaser that the film may have been tampered with and possibly destroyed. The seal in the present invention is arranged about the covered container and engaged with both the film and retaining strip therefor, so that neither movement of the film nor release thereof by the strip is possible without first breaking the seal itself.

The invention therefore resides in a retaining strip for holding the film tightly coiled in a container and in a sealing arrangement for preventing either the container, retaining strip or film from being tampered with without revealing the fact to the one to whom the same is offered for sale. The invention further consists in the essential features of construction and cooperative relationship as above outlined, and incident to the illustrative embodiment in the accompanying drawings, in which, Figure 1 is a side elevational view of the magazine portion of a film container showing the film roll and retaining strip therefor; Figure 2 is a side elevational view of the container with lid and seal applied; and Figure 3 is a perspective view of the retaining strip and sealing strip as they are arranged if disposed in a container.

Referring to the drawings in detail, the container comprises a box or magazine portion 10 in which are formed two recesses or chambers 11 and 12, respectively, adapted to contain the unwinding bobbin 13 and the winding bobbin 14 and also a cover 15 which fits over the magazine portion 10 in any suitable manner. The film constituting the two bobbins 13 and 14 is designated A.

The unwinding bobbin 13 consists of a roll or coil of the film A which fits loosely in the chamber 11, the free end of the film being attached to a cap 16 forming part of a clutch connection between the film holder proper and the take up mechanism of a motion picture camera. Operation of the take up mechanism and consequently the cap 16 will cause the film A to wind up in order to constitute the bobbin 14, the cap 16 being disposed in the recess or chamber 12 and fitted over a collar 17 struck up from the center of the latter chamber 12 and adapted to accommodate the take up spindle or other member of the take up clutch, not illustrated.

The film A is confined, in its movement to form bobbin 14 from bobbin 13, to a passage 18 disposed within the side wall of the magazine and leading to the exterior thereof, and after the exposure, the film is conducted to the interior again to the winding bobbin 14 through a second and similar passage 19, as illustratively exemplified particularly in Figure 1.

The elements of the film holder disclosed in the foregoing description are those which already form the subject matter of a pending patent application.

The attachments embodying the present invention are herein illustrated in connection with a holder of the foregoing type, but it will be understood that such adaptation is mainly by way of example, as the invention is not intended to be limited to any particular style or type of holder except that the latter encloses a coiled length of film liable to become unwound to a degree which would result in a binding condition between film and holder, and as a consequence the intermittently operated mechanism in the camera not being sufficiently powerful to free the film the latter would remain stationary, or if enough power were present the walls of the film perforations would give way and destroy a length of the record.

Referring now to the retaining strip or band the latter comprises two lengths or strips of paper ribbon 20 and 21, the former thereof having a length equal substantially to one-half the circumference of the recess or chamber 11 and bent back upon itself at both ends to form hooks 22 and 23. The hook 22 is adapted to embrace a tapered tongue 24 forming the end of the partition wall between the recess 11 and the passage 18, while hook 23 is disposed against the periphery of the bobbin 13 and is releasably attached to a hook 25 bent from the end of the second strip of paper 21. This strip 21 is disposed about the other half of the bobbin 13 and passes outwardly through the passage 18 on the outside of the film A to the exterior of the holder and thereafter follows the film towards the other passage 19 to a point substantially midway of the length of the holder.

According to the particular style of holder illustrated, the exterior walls follow closely to the outline of the recesses 11 and 12 and as a result the midportion of the holder is slightly indented towards the center at its opposite front and back walls. The film A of course, would normally project in a substantially straight line from the mouth of one passage 18 to mouth of the other passage 19, and in like manner the free end of the retaining strip 21 would be guided by the film at this point. However, in order to seal the holder, film A and retaining band or strip 21, an additional strip of adhesive paper ribbon 26 is placed about the restricted portion of the holder, one end being placed between the front wall of the magazine 10 and film A, while the opposite end is moistened and pasted down on the strip or band 21 adjacent its end and to the band 26 itself, just back of the end projecting under the film.

From the foregoing, it will be clear that a film container embodying the essential features of this invention and properly loaded will provide a bobbin 13 of unexposed film closely embraced by a retaining band, which together with the film itself is suitably sealed, and which after the seal is broken may be withdrawn to release the bobbin and allow the latter to unwind and form the second bobbin, 14.

The operation of the retaining band is as follows: Assuming that the bobbin 13 is closely embraced by the two strips 20 and 21, as illustratively exemplified in Figure 1, the end of the strip 21 held by the seal 26 is separated from the latter and withdrawn from the holder. As a consequence, the interengaged hooks 25 and 23 straighten out under the strain and strip 21 is entirely re moved from the recess 11 and passage 18 leaving the coiled film or bobbin 13 free to unwind. It might be assumed that upon release of the bobbin 13 the latter would immediately uncoil, giving rise to the same binding condition which the invention is intended to obviate. However, this is not so for the reason mainly, that since the film has been retained in its tightly coiled condition for a considerable period, the coils have more or less become set and have not the same tendency to unwind as they usually have when freshly wound by the manufacturer. And a further reason for the free movement of the film after being released, appears to be that only a relatively short space of time intervenes between the removal of the retaining strip and the placing of the holder and positioning of the film in the camera.

What I claim is:—

1. The combination with a film holder having an inner space for the reception of a roll of film and a guide passage for the film out of the holder, of means unattached to and surrounding the roll and passing with the film through said passage out of the holder, to prevent premature uncoiling of the bobbin in said space.

2. The combination with a film holder having an inner space for the reception of a roll of film, and a passage to guide the film in a light tight manner from said inner space to the exterior of the holder, of a separable member surrounding the roll to prevent premature uncoiling of the roll in the space, and passing with the film through the passage to be withdrawn when the bobbin is to be released.

3. The combination with a film holder having an inner space for the reception of a roll of film, and a curved passage to guide the film in a light tight manner from said inner space to the exterior of the holder, of a separable member surrounding the roll and passing with the film through the passage to the exterior of the holder, said member comprising separate strips of ribbon material, one of said strips being folded back upon itself at opposite ends to form hooks, one hook being engaged about the holder at the point where the passage enters the inner space, the other strip being provided with an end portion folded back upon itself to be engaged with the other hook of the first strip.

4. The combination with a film holder having an inner space for the reception of a roll of film and a guide passage for the film out of the holder, of means unattached to and surrounding the roll and passing with the film through said passage out of the holder to prevent premature uncoiling of the bobbin in said space, and means embracing the holder and attached to the first means to prevent movement of the film and first means without severing the last means.

5. The combination with a film holder having an inner space for the reception of a roll of film, a guide passage for the film from the space to the exterior of the holder and a cover for the holder, of means embracing the holder and cover and adhered to the exterior portion of the film to prevent movement thereof or removal of the cover for the film without severing the means.

6. The combination as claimed in claim 3, including a paper band arranged about the holder and provided with adhesive substance to engage the opposite ends upon each other and about the exterior portions of the film and ribbon strip emerging from the passage.

7. As an article of manufacture adapted to prevent premature uncoiling of a film roll within a film chamber, a short length of paper having its opposite end portions folded back upon themselves to provide hooks, one of said hooks being adapted to engage the wall of the chamber, a second longer length of paper having one end folded to form a hook to be engaged with the free end of the first paper, the other end of the second paper being wound about the roll and led off to the exterior of the chamber with the film.

8. The combination with a film holder having an inner space for the reception of a roll of film and an opening through which the film leaves said space to the exterior of the holder, of a strip of material surrounding the roll in said space and leaving said space through said opening and having its end secured to the exterior of said holder.

In testimony whereof I affix my signature.

GASTON L. CHANIER.